US008902796B2

(12) United States Patent  
Haralabidis et al.

(10) Patent No.: US 8,902,796 B2
(45) Date of Patent: Dec. 2, 2014

(54) POWER-EFFICIENT MULTI-MODE TRANSCEIVER SYNTHESIZER CONFIGURATIONS (75) Inventors: Nikolaos Haralabidis, Athens (GR); Konstantinos Vavelidis, Ilioupolis (GR)

(73) Assignee: Broadcom Corporation, Irvine, CA (US)

( * ) Notice: Subject to any disclaimer, the term of this patent is extended or adjusted under 35 U.S.C. 154(b) by 205 days.

(21) Appl. No.: 13/432,528

(22) Filed: Mar. 28, 2012

(65) Prior Publication Data

US 2013/0114469 A1 May 9, 2013

Related U.S. Application Data (60) Provisional application No. 61/556,094, filed on Nov. 4, 2011.

(30) Foreign Application Priority Data

Mar. 20, 2012 (GR) .............................. 20120100168

(51) Int. Cl.
H04B 7/005 (2006.01)
H04B 1/40 (2006.01)
(52) U.S. Cl.
CPC ...................................... H04B 1/403 (2013.01)
USPC ........... 370/278; 455/90.2; 455/255; 455/260
(58) Field of Classification Search
None
See application file for complete search history.

(56) References Cited

U.S. PATENT DOCUMENTS 5,423,076 A * 6/1995 Westergren et al. ............ 455/86
5,465,409 A * 11/1995 Borras et al. .................. 455/260
6,130,897 A * 10/2000 Ishida et al. ................... 370/478
6,226,276 B1 5/2001 Na
8,244,202 B2 * 8/2012 Kitayabu ....................... 455/344
2004/0102172 A1 * 5/2004 Hendin .......................... 455/302
2005/0170805 A1 * 8/2005 Hammes et al. .............. 455/255
2007/0213025 A1 * 9/2007 Vaisanen et al. .............. 455/323
2008/0176523 A1 7/2008 Sutton et al.
2008/0238628 A1 10/2008 Lam et al.

(Continued)

FOREIGN PATENT DOCUMENTS

| CN | 1214579 A | 4/1999 |
| CN | 101926092 A | 12/2010 |
| CN | 101933229 A | 12/2010 |
| CN | 101960720 A | 1/2011 |

OTHER PUBLICATIONS

Office Action directed to related Taiwanese Patent Application No. 101133693, mailed Mar. 17, 2014; 10 pages.

(Continued)

*Primary Examiner* — Ian N Moore
*Assistant Examiner* — Latresa McCallum
(74) *Attorney, Agent, or Firm* — Sterne, Kessler, Goldstein & Fox P.L.L.C.

(57) ABSTRACT

Embodiments of the present disclosure provide power-efficient time division duplexing (TDD) mode configurations of frequency division duplexing (FDD) transceivers. Embodiments avoid time slotted operation of the receive and transmit synthesizers, thereby avoiding undesired operation under transient conditions, frequent calibration, and reduced power supply efficiency. In embodiments, a single synthesizer is used to enable TDD operation, thereby reducing power consumption and calibration requirements by approximately 50%. The single synthesizer may be maintained ON at all times, thus allowing the power supply's switching regulator to operate with substantially constant load conditions.

18 Claims, 5 Drawing Sheets

(56) References Cited

U.S. PATENT DOCUMENTS

| | | |
|---|---|---|
| 2009/0221235 A1 | 9/2009 | Ciccarelli et al. |
| 2009/0298433 A1* | 12/2009 | Sorrells et al. .................. 455/62 |
| 2010/0291891 A1 | 11/2010 | Ridgers et al. |
| 2010/0316098 A1 | 12/2010 | Pals et al. |
| 2010/0327920 A1 | 12/2010 | Newton |
| 2011/0195675 A1* | 8/2011 | Nitsche ........................ 455/90.2 |

OTHER PUBLICATIONS

Office Action directed to related Chinese Patent Application No. 201210372266, mailed Jul. 3, 2014; 7 pages.

* cited by examiner

POWER-EFFICIENT MULTI-MODE TRANSCEIVER SYNTHESIZER CONFIGURATIONS

CROSS-REFERENCE TO RELATED APPLICATION(S)

This patent application claims the benefit of U.S. Provisional Patent Application No. 61/556,094, filed Nov. 4, 2011, entitled "Long Term Evolution Radio Frequency Integrated Circuit."

FIELD OF THE INVENTION

The field of the invention relates generally to wireless communication transceivers.

BACKGROUND

Background Art

For next generation communication devices, it is desirable that the transceiver support both frequency division duplexing (FDD) and time division duplexing (TDD) communication technologies. In FDD mode, transmit and receive functions are performed by the transceiver, on different carrier frequencies, simultaneously. In TDD mode, transmit and receive functions are performed by the transceiver at respective non-overlapping time slots, on the same or different frequencies.

Because two different carrier frequencies are required for FDD mode, at least two synthesizers and two local oscillator (LO) signal generation sections are used, in order to simultaneously generate and deliver high-precision TX and RX LO signals to the TX and RX mixers, respectively.

For TDD mode, a common mode of operation includes selectively powering up/down the RX and TX synthesizers (and associated LO signal generation sections) as needed. For example, the RX synthesizer is powered up during receive time slots and powered down during transmit time slots, and the TX synthesizer is powered up during transmit time slots and powered down during receive time slots. However, because transmit and receive slots are typically highly interleaved in TDD mode, this mode of operation requires very frequent powering up/down of the RX and TX synthesizers, resulting in several significant drawbacks and reduced power savings.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the subject matter of the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
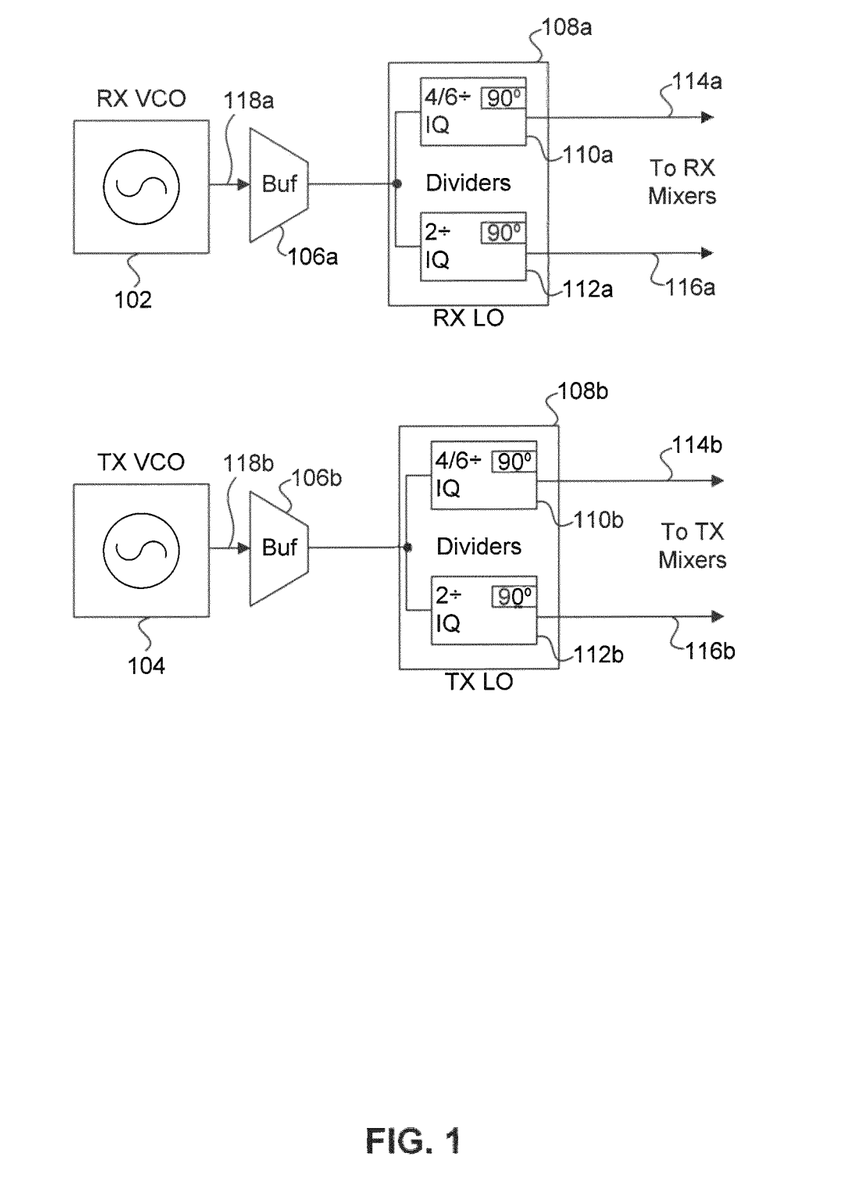
FIG. 1 illustrates an example frequency division duplexing (FDD) transceiver section.

FIG. 1 illustrates an example frequency division duplexing (FDD) transceiver section 100. Example FDD transceiver section 100 is provided for the purpose of illustration and is not limiting. As would be understood by a person of skill in the art based on the teachings herein, section 100 may have a different architecture or implementation details than shown in FIG. 1.

As shown in FIG. 1, example FDD transceiver section 100 includes a receive (RX) portion and a transmit (TX) portion. The RX portion includes a RX synthesizer 102, a buffer 106a, and a RX local oscillator (LO) signal generation section 108a. The TX portion includes a TX synthesizer 104, a buffer 106b, and a TX LO signal generation section 108b.

RX synthesizer 102 and TX synthesizer 104 may each include a voltage controlled oscillator (VCO). RX synthesizer 102 and TX synthesizer 104 may each also include a phase locked loop (PLL) (not shown in FIG. 1), for example, which controls the VCO to generate a VCO output signal 118. VCO output signal 118 is fed into buffer 106, before being provided to RX/TX LO signal generation section 108.

Each of RX and TX LO signal generation sections 108a and 108b may include one or more dividers as needed. For example, as shown in FIG. 1, RX LO signal generation section 108a includes dividers 110a and 112a. Dividers 110a and 112a can be configured to generate RX LO signals 114a and 116a, respectively, which are provided to the RX mixers of the FDD transceiver. Similarly, TX LO signal generation section 108b includes dividers 110b and 112b. Dividers 110b and 112b can be configured to generate TX LO signals 114b and 116b, respectively, which are provided to the TX mixers of the FDD transceiver. RX/TX LO signals 114 and 116 may be single-ended or differential in-phase and quadrature phase (IQ) signals, for example.

Typically, only one of dividers 110 and 112 in RX/TX LO signal generation sections 108 is active at any given time, to generate a RX/TX LO signal 114 or 116. Accordingly, a power up/down function may be implemented to power up/down dividers 110 and 112, as needed, in RX/TX LO signal generation sections 108.

As would be understood by a person of skill in the art, RX and TX LO signal generation sections 108a and 108b may implement different LO signal generation schemes than shown in FIG. 1, including different numbers of dividers and/or divider ratios, for example.

In FDD mode, transmit and receive functions are performed by the transceiver, on different carrier frequencies, simultaneously. Therefore, at least two synthesizers and two LO signal generation sections (as in example FDD transceiver section 100) are needed in order to simultaneously generate and deliver high-precision TX and RX LO signals to the TX and RX mixers.

As such, in FDD transceiver section 100, both the RX and TX portions need to be maintained ON at the same time in FDD mode. This includes maintaining both RX and TX synthesizers 102 and 104 and RX and TX LO signal generation sections 108a and 108b powered on at the same time.

Often, for next generation communication devices, it is desirable that the transceiver support time division duplexing (TDD) communication technologies in addition to FDD communication technologies. In TDD mode, transmit and receive functions are performed by the transceiver at respective non-overlapping time slots, on the same or different frequencies.

A FDD transceiver having a section like example section 100 can be configured to support TDD because, at any time in TDD mode, at most one synthesizer and one LO signal generation section is needed. In a first configuration, both the RX and TX portions of FDD transceiver section 100 are maintained ON at all time. In receive time slots, RX LO signal 114a/116a is used, and TX LO signal 114b/116b is discarded. In transmit time slots, TX LO signal 114b/116b is used, and RX LO signal 114a/116a is discarded. As such, this first configuration is wasteful in terms of power consumption and duty cycle. It may also be sub-optimal for transitions between RX/TX mode due to the fact that advanced 4G-TDD standards require extremely fast transitions between these two modes.

In a second configuration, to conserve power, the RX and TX portions of FDD transceiver section 100 are selectively powered up/down as needed. The RX portion is powered up during receive time slots and powered down during transmit time slots, and the TX portion is powered up during transmit time slots and powered down during receive time slots. Some power savings can be achieved with the second configuration. However, because transmit and receive slots are typically highly interleaved in TDD mode, the configuration requires very frequent powering up/down of the RX and TX portions of FDD transceiver section 100, resulting in several significant drawbacks and reduced power savings, as further described below.

For instance, in certain TDD-based communication standards, transmit/receive transition time allowed between slots may be too short (e.g., 12.5 microseconds) for the RX/TX portion of FDD transceiver section 100 to reach DC-state settling and/or required output frequency tolerance. Typically, to reduce noise in the RX/TX synthesizer's output, capacitors are used to filter out low frequency noise. These capacitors, which are slow to fully charge/discharge, cause the RX/TX synthesizer to have slow DC-state settling compared to TDD slot times. As a result of having slow DC-state settling, portions of the RX/TX synthesizer may never be able to completely power-down within a time slot. For example, the synthesizer's PLL may be only partially off when it is time to power it up again at the beginning of the next time slot. As such, potential power savings of this second configuration are not fully achieved in practice. Further, slow DC-state settling also means that the synthesizer may have to operate (i.e., generate an operational output) under transient conditions. This is especially undesirable in the case of synthesizers with low-voltage VCOs, which are highly sensitive to supply voltage settling problems.

The frequent powering up/down of the RX and TX portions in this second configuration may also cause undesirable transient phenomena. For example, the RX/TX synthesizer's PLL and VCO typically experience undesired device characteristics changes during power up, until DC-state settling is reached. These device characteristics changes may include fluctuations in VCO gain curves (e.g., due to cold-to-hot transitions) and current mismatches in charge pump circuits used in the PLLs, both of which may cause undesired spurs in the VCO output signal. In addition, frequent calibration of circuitry is also needed in this second configuration. For example, typically, the RX/TX synthesizer's VCO needs to be calibrated (in order to operate in the most favorable region of operation) after each power-up.

The frequent powering up/down of the RX and TX synthesizers also makes infeasible the use of a switching regulator-based power supply (which is desired for its very high power efficiency) to power up the transceiver. Generally, switching regulators have slow settling following load changes, which reduces their power efficiency. Frequent powering up/down of the RX and TX synthesizers forces the switching regulator to operate a vast proportion of the time under varying load conditions, significantly lowering its power efficiency.

Embodiments of the present disclosure, as further described below, provide power-efficient TDD mode configurations of FDD transceivers. Embodiments avoid time slotted operation of the RX and TX synthesizers, thereby avoiding the above described drawbacks of operation under transient conditions, frequent calibration, and reduced power supply efficiency. In embodiments, a single synthesizer is used to enable TDD operation, thereby reducing power consumption and calibration requirements by approximately 50%. The single synthesizer may be maintained ON at all times, thus allowing the power supply's switching regulator to operate with substantially constant load conditions.

Figure 2:
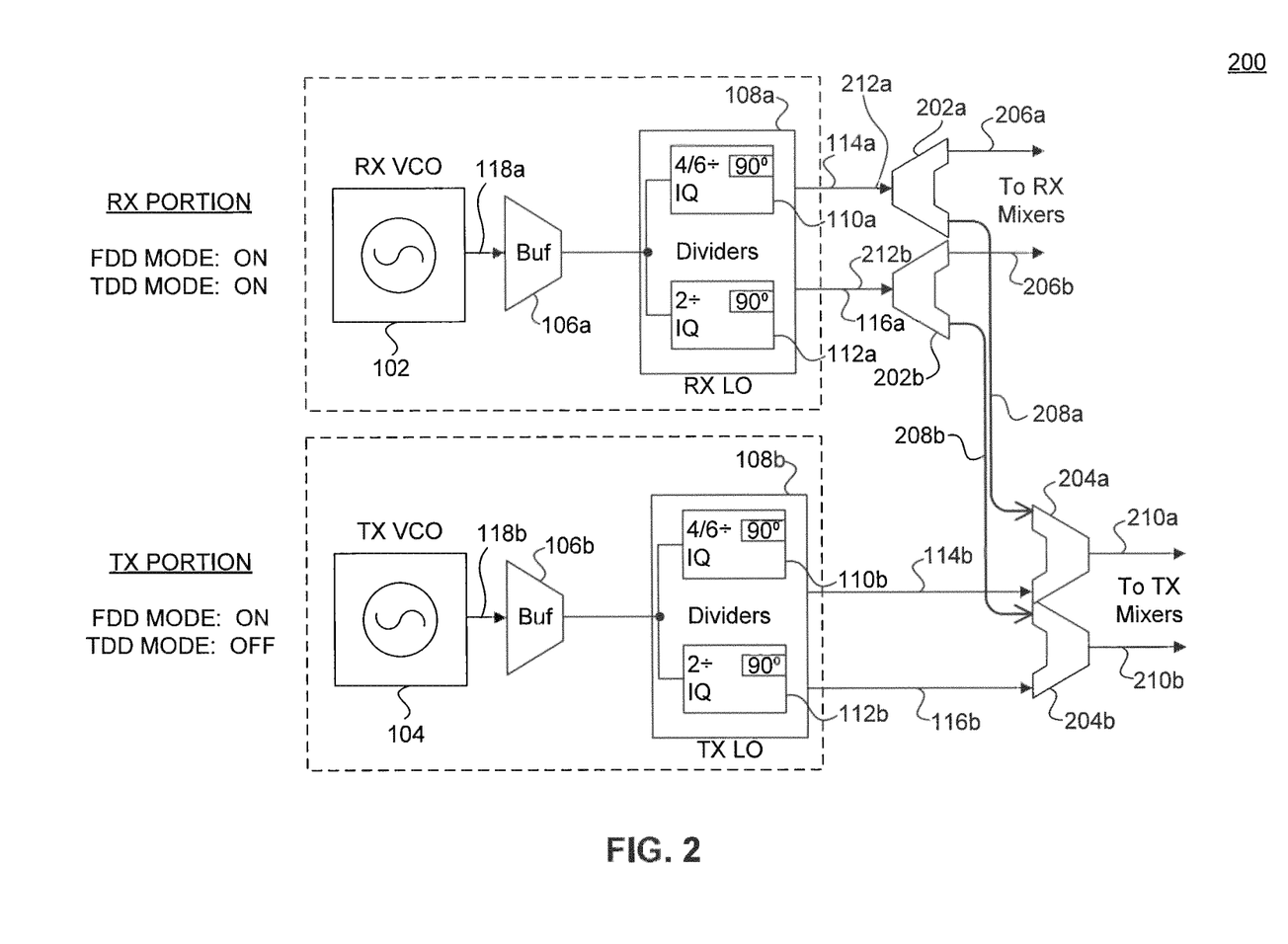
FIG. 2 illustrates an example FDD transceiver section modified for dual FDD-time division duplexing (TDD) operation.

FIG. 2 illustrates an example FDD transceiver section 200 modified for dual FDD-TDD operation. Example FDD transceiver section 200 is provided for the purpose of illustration and is not limiting.

Like example transceiver section 100 described above, example transceiver section 200 also includes an RX portion and a TX portion. The RX portion includes RX synthesizer 102, buffer 106a, and RX LO signal generation section 108a. The TX portion includes TX synthesizer 104, buffer 106b, and TX LO signal generation section 108b.

In addition, transceiver section 200 includes de-multiplexers 202a-b and multiplexers 204a-b. De-multiplexers 202a and 202b are placed at the outputs of RX LO signal generation section 108a, so as to receive, respectively, RX LO signals 114a and 116a. Depending on the transceiver mode (i.e., FDD mode vs. TDD mode) and/or the current transceiver function (i.e., transmit or receive), de-multiplexers 202a and 202b selectively couple, respectively, RX LO signals 114a and 116a either to the RX mixers (via signals 206a and 206b, respectively) or to multiplexers 204a and 204b (via signals 208a and 208b, respectively).

Multiplexers 204a and 204b are placed at the outputs of TX LO signal generation section 108b, so as to receive, respectively, TX LO signals 114b and 116b. In addition, multiplexers 204a and 204b receive, respectively, signals 208a and 208b from de-multiplexers 202a and 202b. Depending on the transceiver mode (i.e., FDD mode vs. TDD mode), multiplexers 204a and 204b selectively couple, respectively, either signals 114b/116b or signals 208a/208b to the TX mixers (via signals 210a and 210b, respectively).

As noted above, typically, only one of the dividers of RX/TX LO signal generation sections 108 is active at any given time to generate either LO signal 114 or LO signal 116. As such, only one of de-multiplexers 202a-b (and their associated output signals 206a-b and 208a-b) and only one of multiplexers 204a-b (and their associated output signals 210a-b) may need to be active at any given time. This is assumed in the description below of the operation of FDD transceiver section 200.

In TDD mode, both the RX and TX portions of MD transceiver section 200 are powered on, in order to enable simultaneous transmission and reception by the transceiver. In this mode, de-multiplexers 202a-b are configured to couple, respectively, RX LO signals 114a and 116a to the RX mixers via signals 206a and 206b, respectively. Signals 208a-b thus remain inactive. Multiplexers 204a-b are configured to couple, respectively, TX LO signals 114b and 116b to the TX mixers via signals 210a and 210b, respectively.

In TDD mode, the RX portion of MD transceiver section 200 is turned ON and the TX portion of FDD transceiver section 200 is turned OFF. During receive time slots, de-multiplexers 202a-b are configured to couple, respectively, RX LO signals 114a and 116a to the RX mixers via signals 206a and 206b, respectively.

In transmit time slots, the RX portion of FDD transceiver section 200 is configured to produce TX LO signals 212a-b. TX LO signals 212a-b may be identical to or different from RX LO signals 114a and 116b, depending on whether transmit and receive functions are performed on same or different carrier frequencies in TDD mode. De-multiplexers 202a-b are configured to couple, respectively, TX LO signals 212a and 212b to multiplexers 204a and 204b, via signals 208a and 208b. Multiplexers 204a and 204b in turn couple, respectively, signals 208a and 208b to the TX mixers, via signals 210a and 210b.

With only the RX portion of FDD transceiver section 200 active in TDD mode, significant power savings can be achieved. In an embodiment, the RX portion is maintained powered on or is only turned off infrequently in TDD mode. As such, the above described problems associated with the frequent powering up/down of the synthesizer are avoided. In addition, in an embodiment, the PLL of synthesizer 102 of the RX portion is characterized by fast settling performance, by virtue of its implementation of embodiments described in U.S. patent application Ser. No. 13/356,137, filed Jan. 23, 2012, entitled "Apparatus and Method for Fast Phase Locked Loop (PLL) Settling for Cellular Time-Division Duplex (TDD) Communications Systems," which is incorporated herein by reference in its entirety. This reduces the negative effects of turning on/off the RX portion, as discussed above.

Figure 3:
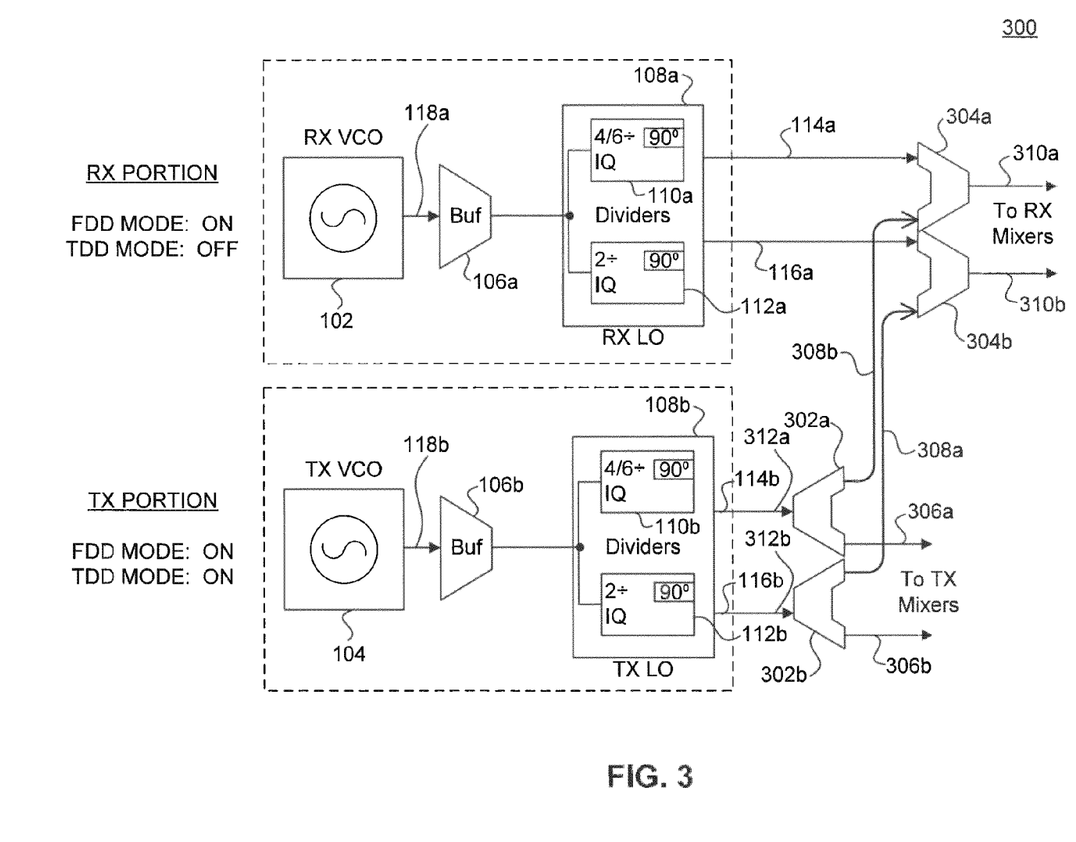
FIG. 3 illustrates another example FDD transceiver section modified for dual FDD-TDD operation.

FIG. 3 illustrates another example FDD transceiver section 300 Modified for dual FDD-TDD operation. Example FDD transceiver section 300 is provided for the purpose of illustration and is not limiting.

Example transceiver section 300 implements a reverse configuration relative to example transceiver section 200 described above in FIG. 2. Specifically, de-multiplexers 202a and 202b of transceiver section 200 are replaced, respectively, with multiplexers 304a and 3041 at the outputs of RX LO signal generation section 108a in transceiver section 300. Multiplexers 204a and 204b of transceiver section 200 are replaced, respectively, with de-multiplexers 302a and 302b at the outputs of TX LO signal generation section 108b in transceiver section 300.

In FDD mode, transceiver section 300 operates as described above with respect to transceiver section 200, with de-multiplexers 302a-b configured to operate like de-multiplexers 202a-b and multiplexers 304a-b configured to operate like multiplexers 204a-b.

In TDD mode, the TX portion of FDD transceiver section 300 is turned ON and the RX portion of FDD transceiver section 300 is turned OFF. During transmit time slots, de-multiplexers 302a-b are configured to couple, respectively, TX LO signals 114b and 116b to the TX mixers via signals 306a and 306b, respectively.

In receive time slots, the TX portion of FDD transceiver section 300 is configured to produce RX LO signals 312a-b. RX LO signals 312a-b may be identical to or different from TX LO signals 114b and 116b, depending on whether transmit and receive functions are performed on same or different carrier frequencies in TDD mode. De-multiplexers 302a-b are configured to couple, respectively, RX LO signals 312a and 312b to multiplexers 304a and 304b, via signals 308a and 308b. Multiplexers 304a and 304b in turn couple, respectively, signals 308a and 308b to the RX mixers, via signals 310a and 310b.

With only the TX portion of FDD transceiver section 300 active in TDD mode, significant power savings can be achieved. In an embodiment, the TX portion is maintained powered on or is only turned off infrequently in TDD mode. As such, the above described problems associated with the frequent powering up/down of the synthesizer are avoided. In addition, in an embodiment, the PLL of synthesizer 104 of the TX portion is characterized by fast settling performance, by virtue of its implementation of embodiments described in U.S. patent application Ser. No. 13/356,137, filed Jan. 23, 2012, entitled "Apparatus and Method for Fast Phase Locked Loop (PLL) Settling for Cellular Time-Division Duplex (TDD) Communications Systems," which is incorporated herein by reference in its entirety. This reduces the negative effects of turning on/off the TX portion, as discussed above.

In practice, depending on the implementation details and operational requirements, example transceiver section 200 may be more favorable than example transceiver section 300, or vice versa. Some of the considerations in selecting between the two example sections include, for example, the respective power efficiencies of the TX and RX portions and the desired TDD transmit/receive carrier frequencies. For example, the RX synthesizer may be designed to support higher frequency ranges than the TX synthesizer. As such, depending on the desired TDD carrier frequencies, either transceiver section 200 or transceiver section 300 may be more suitable.

Figure 4:
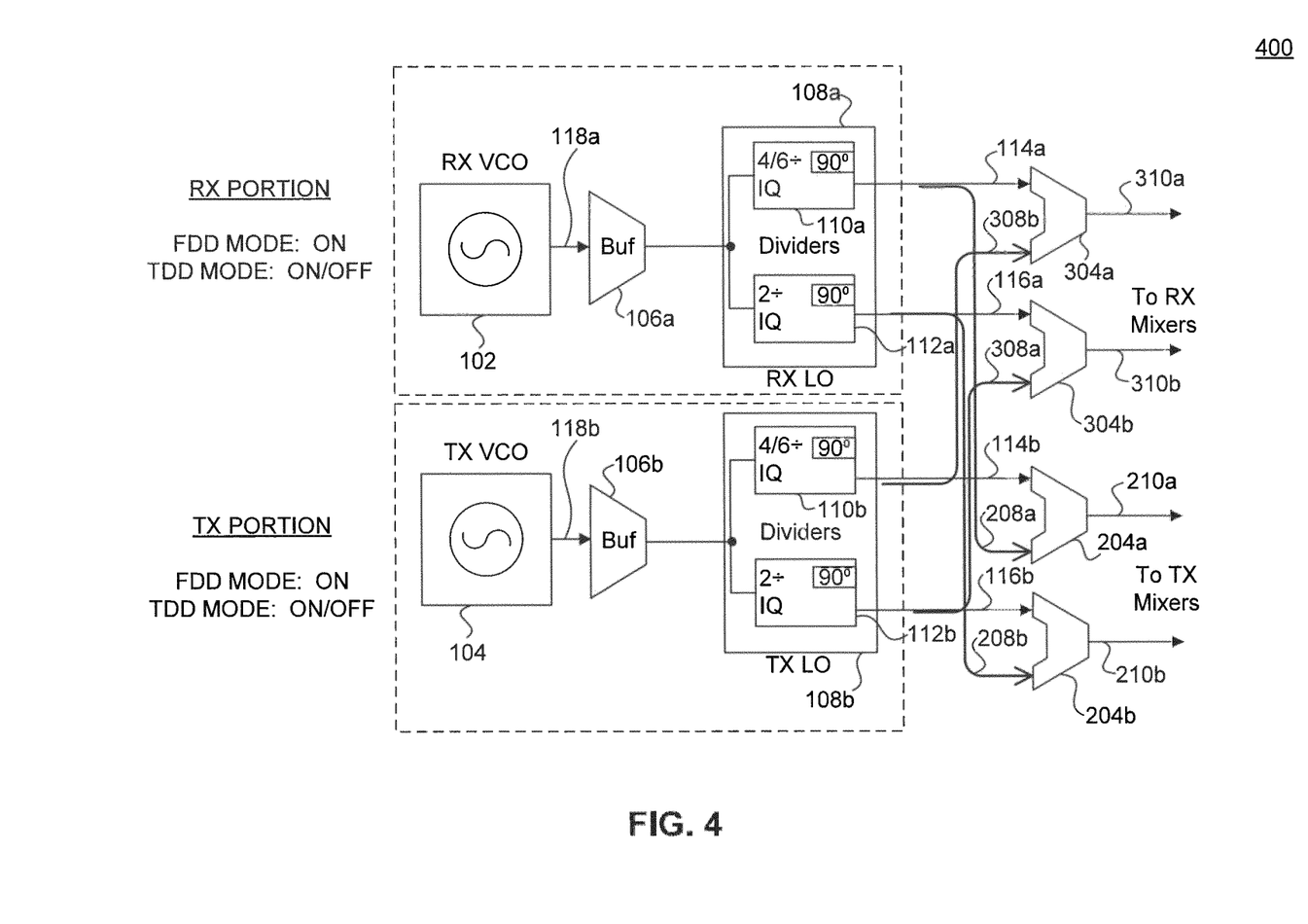
FIG. 4 illustrates another example FDD transceiver section modified for dual FDD-TDD operation.

FIG. 4 illustrates another example FDD transceiver section 400 modified for dual FDD-TDD operation. Example FDD transceiver section 400 is provided for the purpose of illustration and is not limiting.

Example transceiver section 400 implements a combination of the functionalities of example transceiver sections 200 and 300. De-multiplexers 202a-b, as shown in FIG. 2, are placed at the outputs of RX LO signal generation section 108a, but are not shown in FIG. 4 for the ease of illustration. De-multiplexers 302a-b, as shown in FIG. 3, are placed at the outputs of TX LO signal generation section 108b.

In FDD mode, de-multiplexers 202a-b followed by multiplexers 304a-b couple, respectively, RX LO signals 114a and 116a to the RX mixers, via signals 310a and 310b. Similarly, de-multiplexers 302a-b followed by multiplexers 204a-b couple, respectively, TX LO signals 114b and 116b to the TX mixers, via signals 210a and 210b.

In TDD mode, either one of the RX portion and the TX portion of FDD transceiver section 400 is turned ON, and the other one is turned OFF. Selection between the two configurations can be made on the fly. When the RX portion is ON, multiplexers 204a-b are active and transceiver section 400 operates like example transceiver section 200 in TDD mode. When the TX portion is ON, multiplexers 304a-b are active and transceiver section 400 operates like example transceiver section 300 in TDD mode.

Figure 5:
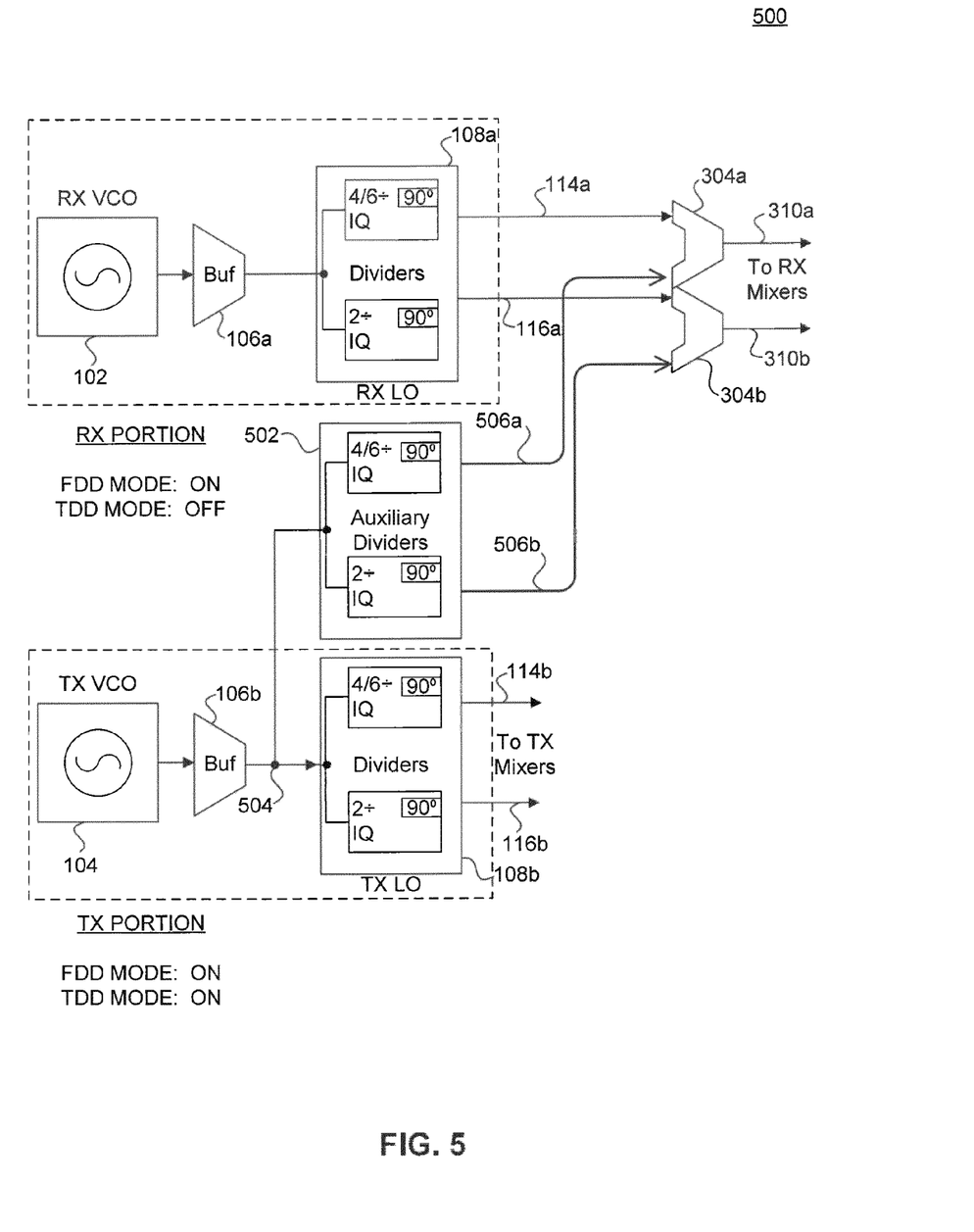
FIG. 5 illustrates another example FDD transceiver section modified for dual FDD-TDD operation.

FIG. 5 illustrates another example FDD transceiver section 500 modified for dual FDD-TDD operation. Example FDD transceiver section 500 is provided for the purpose of illustration and is not limiting. Example FDD transceiver section 500 is a variation of example transceiver section 300 described above in FIG. 3. Specifically, transceiver section 500 uses a separate (auxiliary) LO signal generation section 502 to generate the RX LO signals during TDD mode. As shown in FIG. 5, LO signal generation section 502 may include one or more auxiliary dividers as needed.

In FDD mode, both the RX and TX portions of FDD transceiver section 500 are powered on, in order to enable simultaneous transmission and reception by the transceiver. In this mode, multiplexers 304*a-b* are configured to couple, respectively, RX LO signals 114*a* and 116*a* to the RX mixers via signals 310*a* and 310*b*, respectively. TX LO signals 114*b* and 116*b* are coupled directly to the TX mixers (i.e., de-multiplexers 302*a-b* are eliminated in example transceiver section 500). LO signal generation section 502 is inactive during FDD mode.

In TDD mode, the TX portion of FDD transceiver section 500 is turned ON and the RX portion of FDD transceiver section 500 is turned OFF. During receive time slots, LO signal generation section 502 is configured to receive an output signal 504 from buffer 106*b* of the TX portion. LO signal generation section 502 generates RX LO signals 506*a-b*, which are provided to multiplexers 304*a-b*. Multiplexers 304*a-b* couple, respectively, RX LO signals 506*a-b* to the RX mixers. In transmit time slots, TX LO signals 114*b* and 116*b* are provided to the TX mixers in the same manner as in FDD mode. In an embodiment, a switching stricture (e.g., switch, de-multiplexer, etc.) (not shown in FIG. 5) is used to selectively couple output signal 504 to LO signal generation section 502 during receive time slots and to TX LO signal generation section 108*b* during transmit time slots.

In an embodiment, LO signal generation section 502 is placed physically close to the RX mixers. This results in a better signal quality of RX LO signals 310*a-b* than in example transceiver section 300, for example, since IQ LO signals 506*a-b* of LO signal generation section 502 traverse a much shorter distance to reach multiplexers 304*a-b* than IQ LO signals 312*a-b* do in transceiver section 300. Note that the signal quality of output signal 504 of buffer 106*b* is not affected significantly by having to traverse a relatively large distance to LO signal generation section 502, because output signal 504 is not in IQ form (i.e., no risk of introducing phase errors between the I and Q components).

As would be understood by a person of skill in the art based on the teachings herein, in another variation, FDD transceiver section 500 can be implemented so that the RX portion of the FDD transceiver section is turned ON and the TX portion of the FDD transceiver is turned off in TDD mode. LO signal generation section 502 would thus generate the TX LO signals during TDD mode by receiving and dividing the respective signal from the output of buffer 106*a*.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A transceiver, comprising:
   a transmit portion, including:
      a transmit synthesizer; and
      a transmit local oscillator (LO) signal generation section;
   a receive portion, including:
      a receive synthesizer configured to generate a first clock signal; and
      a receive LO signal generation section configured to generate a first LO signal from the first clock signal; and
   a switching structure configured, in a time division duplexing (TDD) mode of the transceiver, to couple the first LO signal to a receive mixer during a receive time slot of the TDD mode and to a transmit mixer during a transmit time slot of the TDD mode,
   wherein, in a frequency division duplexing (FDD) mode of the transceiver, the transmit synthesizer is configured to generate a second clock signal, and the transmit LO signal generation section is configured to generate a second LO signal from the second clock signal, and
   wherein the switching structure comprises:
      a demultiplexer configured, in the TDD mode of the transceiver, to receive the first LO signal and to couple the first LO signal to the receive mixer during the receive time slot of the TDD mode and to the transmit mixer during the transmit time slot of the TDD mode; and
      a multiplexer configured to receive the first LO signal and the second LO signal and to couple the first LO signal to the transmit mixer in the TDD mode of the transceiver and to couple the second LO signal to the transmit mixer in the FDD mode of the transceiver.

2. The transceiver of claim 1, wherein the transmit portion is configured to be powered down during the TDD mode of the transceiver.

3. The transceiver of claim 1, wherein a frequency of the first LO signal corresponds to a transmit carrier frequency of the transceiver during the transmit time slot and to a receive carrier frequency of the transceiver during the receive time slot.

4. The transceiver of claim 1, wherein in the FDD mode of the transceiver, the switching structure is configured to couple, simultaneously, the first LO signal to the receive mixer and the second LO signal to the transmit mixer.

5. The transceiver of claim 1, wherein both the transmit portion and the receive portion are configured to be powered on during the FDD mode of the transceiver.

6. The transceiver of claim 1, wherein the first and second LO signals are single-ended or differential.

7. The transceiver of claim 1, wherein the multiplexer is further configured to receive the first LO signal from the demultiplexer during the transmit time slot of the TDD mode.

8. A transceiver, comprising:
   a transmit portion, including:
      a transmit synthesizer configured to generate a first clock signal; and
      a transmit local oscillator (LO) signal generation section configured to generate a first LO signal from the first clock signal;
   a receive portion, including:
      a receive synthesizer; and
      a receive LO signal generation section; and a switching structure configured, in a time division duplexing (TDD) mode of the transceiver, to couple the first LO signal to a receive mixer during a receive time slot of the TDD mode and to a transmit mixer during a transmit time slot of the TDD mode, wherein, in a frequency division duplexing (FDD) mode of the transceiver, the receive synthesizer is configured to generate a second clock signal, and the receive LO signal generation section is configured to generate a second LO signal from the second clock signal, and wherein the switching structure comprises:
  a demultiplexer configured, in the TDD mode of the transceiver, to receive the first LO signal and to couple the first LO signal to the receive mixer during the receive time slot of the TDD mode and to the transmit mixer during the transmit time slot of the TDD mode; and
  a multiplexer configured to receive the first LO signal and the second LO signal and to couple the first LO signal to the receive mixer in the TDD mode of the transceiver and to couple the second LO signal to the receive mixer in the FDD mode of the transceiver.

9. The transceiver of claim 8, wherein the receive portion is configured to be powered down during the TDD mode of the transceiver.

10. The transceiver of claim 8, wherein in the FDD mode of the transceiver, the switching structure is configured to couple, simultaneously, the first LO signal to the transmit mixer and the second LO signal to the receive mixer.

11. The transceiver of claim 8, wherein both the transmit portion and the receive portion are configured to be powered on during the FDD mode of the transceiver.

12. The transceiver of claim 8, wherein a frequency of the first LO signal corresponds to a transmit carrier frequency of the transceiver during the transmit time slot and to a receive carrier frequency of the transceiver during the receive time slot.

13. The transceiver of claim 8, wherein the first and second LO signals are single-ended or differential.

14. The transceiver of claim 8, wherein the multiplexer is further configured to receive the first LO signal from the demultiplexer during the receive time slot of the TDD mode.

15. A transceiver, comprising:
a transmit portion and a receive portion, including:
  a synthesizer configured to generate a first clock signal; and
  a local oscillator (LO) signal generation section;
a transmit mixer;
a receive mixer;
an auxiliary LO signal generation section;
a switching structure configured, in a time division duplexing (TDD) mode of the transceiver, to couple the first clock signal to the auxiliary LO signal generation section during a receive time slot of the TDD mode and to the LO signal generation section during a transmit time slot of the TDD mode, wherein the LO signal generation section is configured, during the transmit time slot, to generate a first LO signal from the first clock signal and to provide the first LO signal to the transmit mixer, and wherein the auxiliary LO signal generation section is configured, during the receive time slot, to generate a second LO signal from the first clock signal and to provide the second LO signal to the receive mixer,
a second synthesizer configured to generate a second clock signal during a Frequency Division Duplexing (FDD) mode of the transceiver; and
a second LO signal generation section configured to generate a third LO signal from the second clock signal during the FDD mode of the transceiver.

16. The transceiver of claim 15, further comprising:
a multiplexer configured to couple the second LO signal to the receive mixer during the receive time slot of the TDD mode, and to couple the third LO signal to the receiver mixer during the FDD mode of the transceiver.

17. The transceiver of claim 15, wherein the synthesizer and the LO signal generation section are part of the transmit portion, and wherein the receiver portion is configured to be powered down during the TDD mode of the transceiver.

18. The transceiver of claim 15, wherein the synthesizer and the LO signal generation section are part of the receiver portion, and wherein the transmit portion is configured to be powered down during the TDD mode of the transceiver.

* * * * *

UNITED STATES PATENT AND TRADEMARK OFFICE
CERTIFICATE OF CORRECTION

PATENT NO.       : 8,902,796 B2  
APPLICATION NO.  : 13/432528  
DATED            : December 2, 2014  
INVENTOR(S)      : Haralabidis et al.

Page 1 of 1

It is certified that error appears in the above-identified patent and that said Letters Patent is hereby corrected as shown below:

In the Specification

In column 5, line 43, replace "304a and 3041" with --304a and 304b--.

Signed and Sealed this  
Twenty-first Day of April, 2015

Michelle K. Lee  
*Director of the United States Patent and Trademark Office*